United States Patent [19]

Sato et al.

[11] Patent Number: 5,182,657
[45] Date of Patent: Jan. 26, 1993

[54] IMAGE PROCESSING APPARATUS INCLUDING BINARY DATA PRODUCING UNIT

[75] Inventors: Takashi Sato, Higashiyamato; Teruo Sano, Kawasaki, both of Japan

[73] Assignee: Casio Computer Co., Ltd., Tokyo, Japan

[21] Appl. No.: 513,566

[22] Filed: Apr. 24, 1990

[30] Foreign Application Priority Data

Apr. 27, 1989 [JP] Japan ................................. 1-108795
Jun. 12, 1989 [JP] Japan ................................. 1-149194

[51] Int. Cl.$^5$ ............................................. H04N 1/04
[52] U.S. Cl. .............................. 358/465; 358/213.11; 358/448; 358/466; 358/483
[58] Field of Search ............... 358/448, 455, 456, 465, 358/466, 482, 483, 75, 80, 213.11, 213.23, 43, 44

[56] References Cited

U.S. PATENT DOCUMENTS 4,841,374  6/1989  Kotani et al. ..................... 358/483
4,908,875  3/1990  Assael et al. ..................... 358/466

Primary Examiner—Edward L. Coles, Sr.
Assistant Examiner—Jerome Grant, II
Attorney, Agent, or Firm—Frishauf, Holtz, Goodman & Woodward

[57] ABSTRACT

An image data processing apparatus binary-codes an image signal obtained from an image sensor of the CCD type or the like so as to output a binary-coded image signal. The image signal obtained from the image sensor A/D-converted into digital image data. Based upon the digital image data, average values of luminance values of the digital image data are calculated for an array of pixels in a preselected area of the CCD. This average value is used as a threshold level for binary coding the image data for these pixels at the center portion of this preselected area. Furthermore, to detect coutours this data processing apparatus calculates a gradient in the luminance values of the pixels in a portion of the preselected area of the CCD in an X direction and a Y direction, and the gradient value is used to obtain binary-coded data in accordance with the above-described method.

14 Claims, 8 Drawing Sheets

IMAGE PROCESSING APPARATUS INCLUDING BINARY DATA PRODUCING UNIT

BACKGROUND OF THE INVENTION

1. Field of the Invention

The present invention relates to a binary-coded image information producing apparatus used in black/white copiers, facsimiles, and other electronic products.

2. Description of the Related Art

Up to now, various methods and systems have been proposed by which binary-coded image information can be obtained from analog image information. In general, most of these binary coding methods/systems aim to more accurately represent an original image, by which a half tone image can be represented as a quasi-half tone image.

As the above-described quasi-half tone image producing method such a quasi-half tone image has been represented by obtaining a binary coded image, while varying a dot number within a predetermined area in response to a tone of an original image.

However, for some practical applications it is necessary that only a certain portion of interest contained in an original image must be duplicated as a sharp image. For instance, when the portion of interest photograph is only the black alpha-numeric characters included in it, difficulties arise in reproducing the characters well with such binary coding methods capable of representing a quasi-half tone image. That is, it is sometimes difficult to discriminatively represent these black-colored characters printed on the quasi-half tone image. The reasons are as follows. Since, as previously described, the dot quantity of the image is varied in accordance with the tone of the original image, there is no change in the dot quantities of both the characters and background portion in case that practically no difference exists in the tones between the characters and background.

Furthermore, a tone of an area around a contour of characters and a background thereof is represented based upon dot quantities of these contour and background so that the sharpness of the character contour is deteriorated. In such a case, a binary coding method capable of accurately and sharply reproducing the alpha-numeric characters contained in an original image is preferable to a binary coding method which is meant to be capable of correctly reproducing the entire original image.

SUMMARY OF THE INVENTION

A primary object of the present invention is to provide a binary-coded image information producing apparatus capable of sharply reproducing a specific portion contained in an original image and, in particular, alpha-numeric characters and the like.

To achieve the above-described object of the present invention, an image processing apparatus of the invention comprises;

image sensing means having a plurality of photoelectric converting elements, for outputting electric signals of an optical image converted by said photoelectric converting elements;

selecting means for selecting said electric signals produced by a predetermined number of said photoelectric converting elements, in sequence;

arithmetic means for producing an average value of said electric signals selected by said selecting means; and, binary data producing means for producing binary data in response to at least one of said electric signals (at a center) of said electric signals selected by said selecting means with said average value produced by said arithmetic means as a threshold value.

Further, the above-described object may be achieved by providing an image processing apparatus according to the present invention, comprising:

image sensing means having a plurality of photoelectric converting elements for outputting electric signals of an optical image converted by said photoelectric converting elements in a predetermined order;

difference-value signal producing means for producing difference-value signals according to a difference in amounts of said electric signals output from said image sensing means;

first binary data output means for outputting one-leveled data of first binary data after said difference-value signals produced by said difference-value signal producing means become more than a first positive reference value, and for outputting another-leveled data of said first binary data after said difference-value signals produced by said difference-value signal producing means become more than a first negative reference value;

second binary data output means for outputting one-leveled data of second binary data after said difference-value signals produced by said difference-value signal producing means become more than a second positive reference value which is less than said first positive reference value, and for outputting another-leveled data of said second binary data after said difference-value signals produced by said difference-value signal producing means become less than a second negative reference value which is more than said first negative reference value; and, addition means for adding said second binary data output from said second binary data output means, while said first binary data output means outputs one of one-leveled data and another-leveled data to said first binary data output from said first binary data output means.

BRIEF DESCRIPTION OF THE DRAWINGS

The above-described object and features of the present invention may be understood by the following descriptions with reference to the accompanying drawings, in which.

DESCRIPTION OF THE PREFERRED EMBODIMENTS

Construction of Compact Copier

Figure 1:
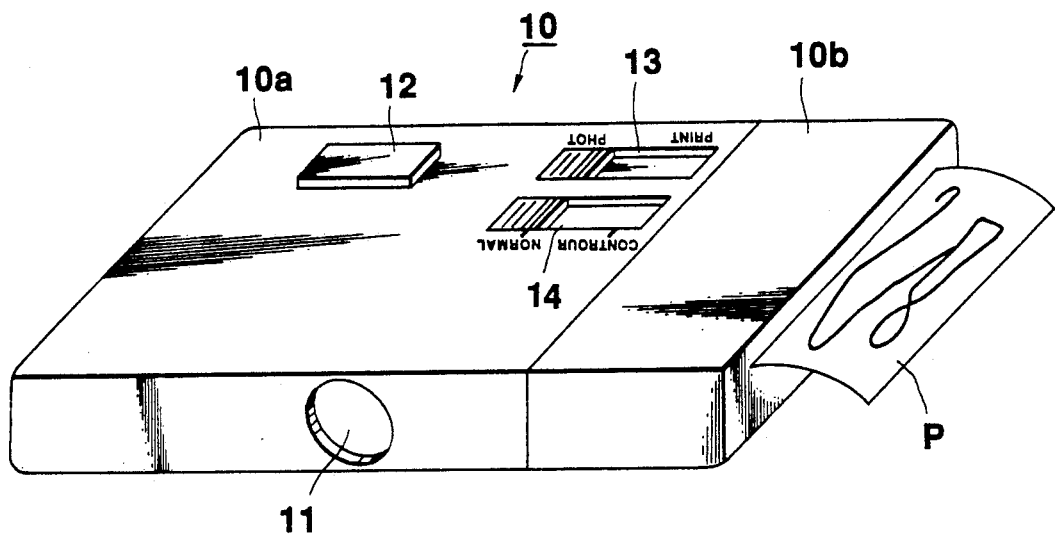
FIG. 1 is a perspective view of a compact copier employing a binary coding circuit according to a preferred embodiment of the present invention.

In FIG. 1, there is shown a perspective view of a compact copying machine, or copier, the exterior of which is formed by a housing case 10. This housing case 10 is constructed of a photographing unit 10a and a printing unit 10b. A lens 11 used for a photographing operation is provided in a front surface of the photographing unit 10a so as to optically form an image to be copied. At an upper surface of this photographing unit 10a, there are provided: a release switch 12 for starting a photographing process of an image to be copied and a printing process thereof; a mode changing switch 13 for changing a photographing mode into a printing mode and vice versa; and a copy mode instruction switch 14 for selecting either a contour copy mode or a normal copy mode (as explained below).

Figure 2:
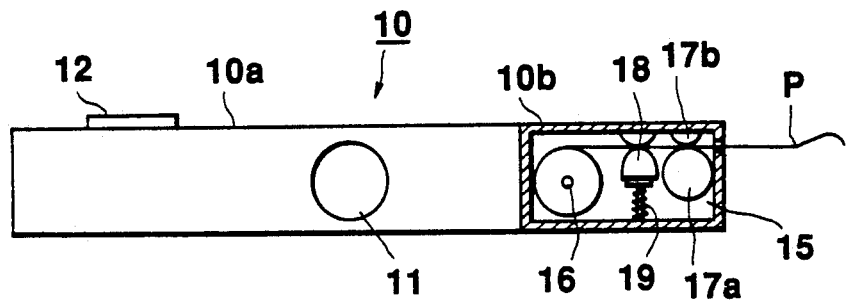
FIG. 2 is a front view, partially in sectional view of the compact copier shown in FIG. 1.

FIG. 2 illustrates an arrangement of a printer 15 employed in the printing unit 10b of this copying machine. A paper supply roller 16 on which a heat sensitive recording paper "P" has been wound is employed inside this printer 15. Thus, the recording paper "P" is stored on this roller 16 and fed out from the housing case 10 of the copying machine while being pinched between rotating rollers 17a and 17b. Between the rotating roller 17a and paper supply roller 16, a thermal head 18 is provided under the condition that this head 18 is forcibly urged into contact with a heat sensitive recording surface of the recording paper "P" by a spring 19. The output timing of the print data by the thermal head 18 is controlled in accordance with a paper feed speed of the recording paper "P" defined by the rotating roller 17a.

When it is desired to use the above-described compact copying machine 10 to duplicate an original, the mode selecting switch 13 is set to the photographing mode. After an image of the original is optically photographed while observing it through a viewfinder (not shown in the drawings), the release switch 12 is depressed. Then, the image to be copied is optically focused onto a solid-stage imaging element (will be discussed later) provided within the photographing unit 10a to produce an analog signal which is thereafter converted into digital data and stored in an electronic memory. Subsequently, the mode selecting switch 13 is set to the printing mode and the release switch 12 is depressed. Accordingly, the stored image data obtained of the original image with the photographing unit 10a are successively output to the thermal head 18 of the printer 15 and printed out on the recording paper "P".

In this case, when the normal duplication (copy) mode is previously designated by the copy mode instruction switch 14, the image data are binary-coded in accordance with the density thereof and printed out on the recording paper "P". When the contour duplication mode is designated, the image data are binary-coded in such manner that the entire image region is subdivided into a region where a difference in the density is rapidly changed, and also another region having no rapidly changing density. Then, the image data of both regions are printed out on the recording paper "P".

Circuit Arrangement of Compact Copier

Figure 3:
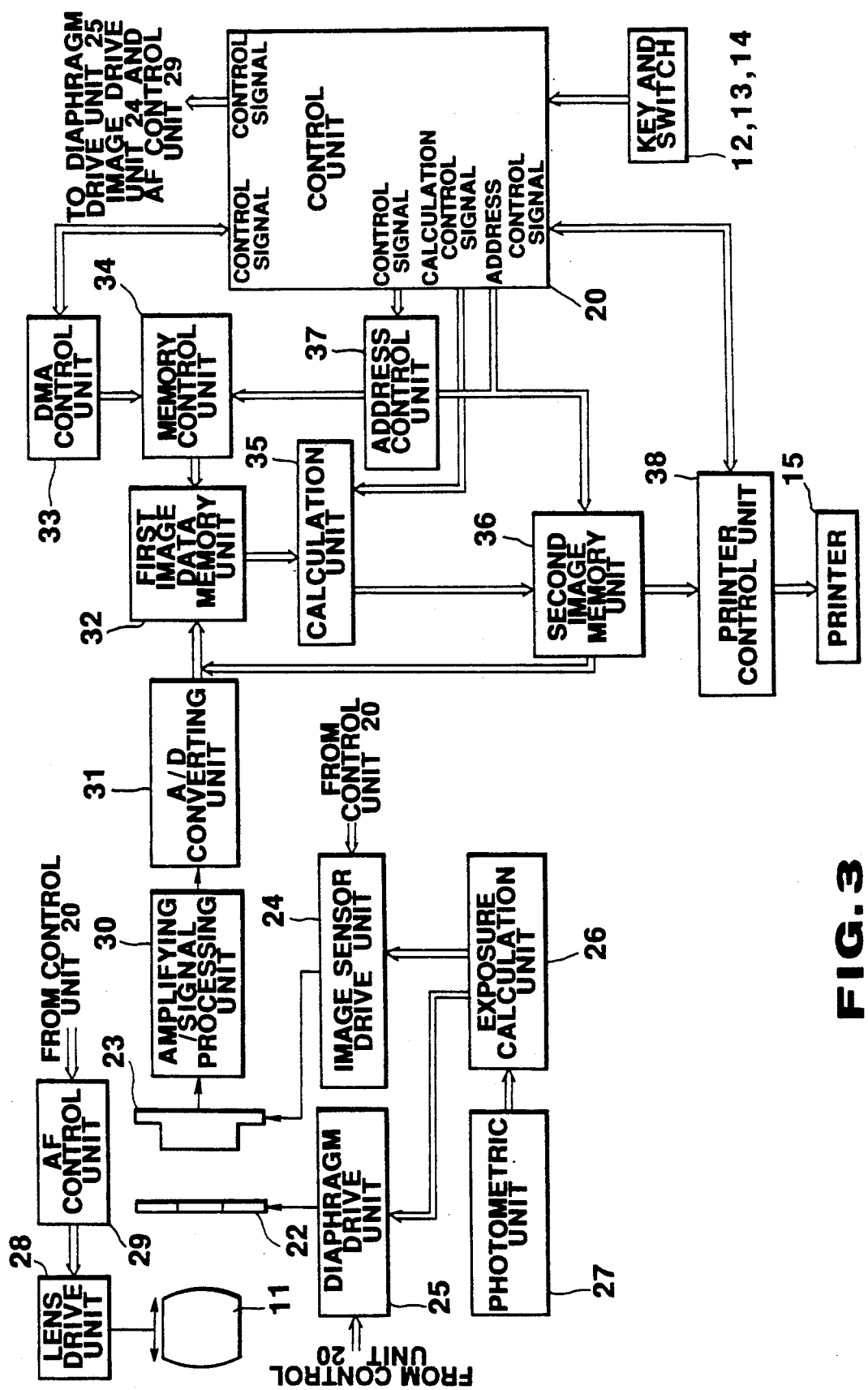
FIG. 3 is a schematic block diagram showing the internal arrangement of the compact copier shown in FIG. 1 including its structural components and circuitry.

FIG. 3 shows an electronic circuit arrangement of the above-described compact copying machine. A control unit 20 is employed so as to control various operations of circuits thereof in response to a key operation signal and a switch operation signal derived from a key and switch 12, 13 and 14.

In the photographing mode, an optical image incident upon the photographing lens 11 is focused onto an image sensor 23 via a diaphragm 22. This image sensor 23 is, for instance, a solid-state imaging (image pickup) element (referred to as a "CCD") having a ½ inch size and 390,403 pixels (509×767 picture elements). The image sensor 23 is driven by an image sensor drive unit 24 into which the above-described control signal is supplied from the control unit 20. The diaphragm 22 is also driven by a diaphragm drive unit 25 into which the control signal is furnished from the control unit 20. An exposure calculation unit 26 is connected to these image sensor drive unit 24 and diaphragm drive unit 25. The function of this exposure calculation unit 26 is to obtain an optimum exposure value based upon brightness around an image to be copied (i.e., a subject to be imaged) which is photometric-measured by a photometric unit 27. Accordingly, both the above described image sensor drive unit 24 and diaphragm drive unit 25 drive the image sensor 23 and diaphragm 22 in accordance with a shutter speed and an open degree of the diaphragm which are set based upon the above-described optimum exposure value, and also automatically adjust both an exposing time for the image sensor 23 and the open degree of the diaphragm.

The photographing lens 11 is driven by a lens drive unit 28. An AF control unit 29 is connected to this lens drive unit 28, into which the control signal is supplied from the control unit 20. The function of this AF control unit 29 is to measure an optimum focal length by utilizing, for instance, an ultrasonic reflection from the image to be copied. Based upon the measured optimum focal length, the lens drive unit 28 drives the lens 11 and automatically adjusts the focal length.

The image sensor 23 generates analog image signals which are output with levels corresponding to the densities of the focused images detected at each of its pixels. These are input via an amplifying/signal processing unit 30 to an A/D (analog-to-digital) converting unit 31. The functions of the above-described amplifying/signal processing unit 30 are to amplify the analog image signals supplied from the image sensor 23 to a predetermined voltage level, to remove such a frequency component higher than a frequency A/D-convertable in the A/D converting unit 31, and also to clamp the black-level voltage at a reference voltage at a negative voltage side of this A/D converting unit 31. The A/D converting unit 31 converts the analog image signals input from the respective pixels of the image sensor 23 into 6-bit digital data. The digital image data output from this A/D converting unit 31 are successively supplied to a first image data memory unit 32 and stored therein. A memory capacity of this first data memory unit 32 corresponds to at least (509×767) of the image sensor 23. A write address used for this first image data memory unit 32 is designated via a memory control unit 34 by a DMA (direct memory access) control unit 33.

In the above-described photographing mode, the image data which have been stored in the first image data memory unit 32, are processed in a calculation unit 35 to which a calculation control signal is supplied from the control unit 20. That is, a binary coding process for either a photographic density, or a contour of the image data is performed in the calculation unit 35 under the control of the control unit 20. Accordingly, the processed image data are transferred as binary coded image data having "1(black)" or "0 (white)" level to a second image data memory unit 36. In this case, both a read address and a write address for the first image data memory unit 32 and second image data memory unit 36 are designated from an address calculation unit 37 to which the control signal is supplied from the control unit 20.

Binary-Coding of Imaging Area

Figure 4:
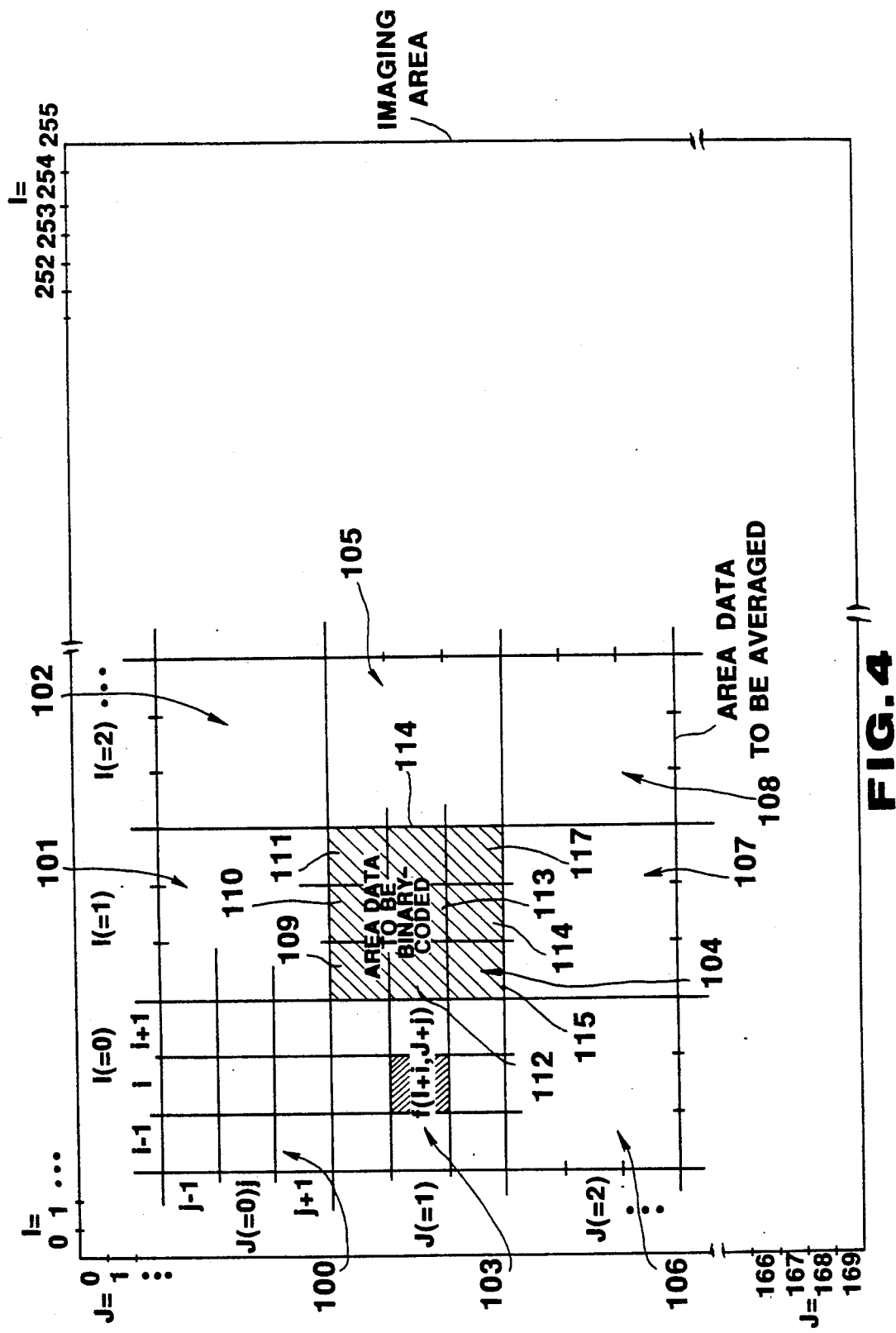
FIG. 4 schematically illustrates a pixel arrangement of the image sensor shown in FIG. 3.

FIG. 4 illustrates an arrangement of pixels in the imaging area of the image sensor 23. It should be noted that for the sake of simple explanation of FIG. 4, "I" and "J" are determined as coordinates representative of the areas of the three pixels, and furthermore, "i" and "j" are determined as coordinates indicative of the respective signal pixels within the three pixels represented by "I" and "J". A brief review of binary coding based on this invention will now be provided, with a detailed discussion.

As to the photographic density binary coding process of the image data stored in the memory unit 32, data corresponding to a 9×9 pixel area of the image sensor 23 is retrieved from the memory unit 32, and a calculation is performed by the calculation unit 35 to obtain an average value "A" of the photographic density in the 9×9 pixel area. The calculated average density calculated value "A" is used as a threshold value for binary coding (in a manner described below in detail) each of the image data in a 3×3 pixel area at the center of the 9×9 pixel area. Thereafter, the 9×9 pixel area used for binary coding of the respective image data on the 3×3 pixel area at its center is successively moved by 3-pixel increments, first along a horizontal direction and then along a vertical direction of a pixel array, and the above-described calculation is repeated for each such 9×9 pixel area. As a result, all of the image data of all pixels except for a 3-pixel wide strip along the periphery of the image sensor can be binary-coded in this way.

With respect to the contour binary coding process for the image data, first of all, absolute values are calculated for a 3×3 pixel area from (1) a difference in photographic densities between the 3 pixels forming the left side and the 3 pixels forming the right side of the 3×3 pixel area, and (2) a difference in photographic densities between the 3 pixels forming the top row and the 3 pixels forming the bottom row by the 3×3 pixel area. Then, these absolute values are summed with each other, and the resultant value is used as the density gradient value for the center pixel of this 3×3 pixel area. Subsequently, such a setting process of the density gradient value of the center pixel in this 3×3 area is successively moved by 1 pixel increments along both the horizontal and vertical directions of the pixel array and the calculation is repeated, so that finally, the density gradient values of all the respective pixels except for 1 pixel wide area around the periphery of the entire image sensor 23 have been set. Thereafter, the density binary coding process described above is similarly executed on the image data derived by setting the density gradient values to the respective pixels. As a result, all of the image data except for the 1 pixel wide area around the periphery of the image sensor can be processed with respect to the contour binary coding to discern the portion of the original having the large density gradient from the remaining portion.

The binary-coded image data which have been processed for either the density binary process or contour binary process, and stored in the second image data memory unit 36, are successively read out therefrom in response to the operation signals of the release switch 12 in the printing mode, and thereafter transferred to the printer control unit 38. This printer control unit 38 performs the temperature control of the thermal head 18 in response to the control signal derived from the control unit 20. The image data output via the printer control unit 38 are transferred to the printer 15, and thus printed out as an image on the recording paper "P" in synchronism with the paper feed speed of this recording paper "P".

Operations of Compact Copier

Various operations of the above-described compact copying machine with the above-described arrangements will now be described.

When, for instance, a three-dimensional image is copied by utilizing this compact copying machine, the mode selecting switch 13 is set to the photographing mode, and after the three-dimensional image to be copied is optically captured while observing this image through the viewfinder (not shown), the release switch 12 is depressed. Thus, this image is optically focused onto the image sensor 23 employed within the photographing unit 10a, through the photographing lens 11. In this case, the automatic exposure control is performed by the exposure calculation unit 26 via the image sensor drive unit 24 and diaphragm drive unit 25. Also the automatic focusing control is performed by the AF control unit 29 via the lens drive unit 28.

Now, it should be understood that electric charges corresponding to the densities of the three-dimensional image to be copied have been stored with respect to the respective pixels of the image sensor 23.

When the image has been focused onto the image sensor 23, the image signals are sequentially output via the amplifying/signal processing unit 30. Then, these analog image signals are converted into the 6-bit digital image data, and thereafter the 6-bit digital image data are stored into the first image data memory unit 32. It should be noted that the digital image data stored into the respective memory regions of the first image data memory unit 32 corresponds in value to the analog charge levels stored into the respective pixels of the image sensor 23.

Density Binary-Coding Process

Figure 5:
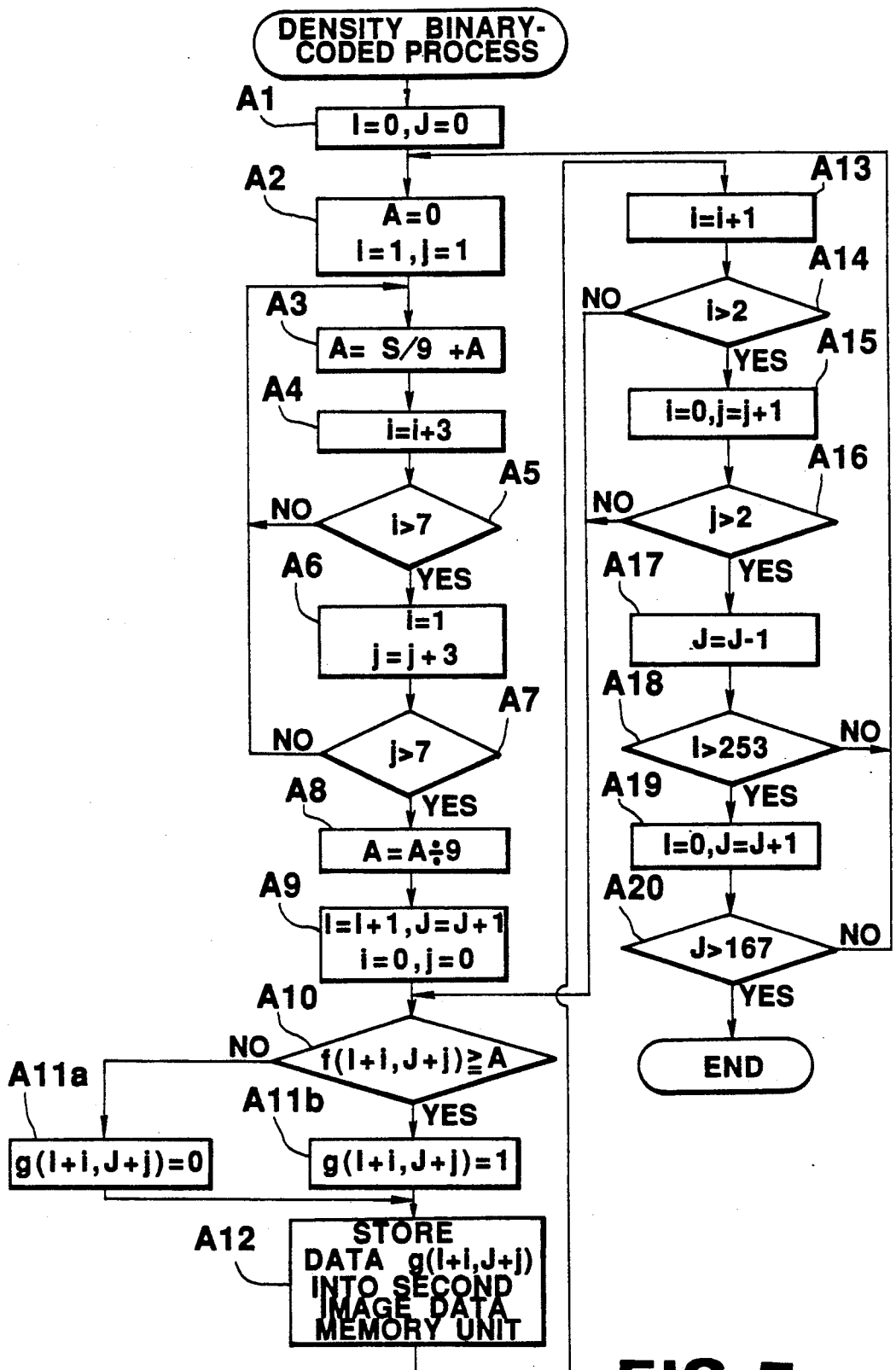
FIG. 5 is a flowchart for explaining a binary coding operation of concentration performed by the circuit shown in FIG. 3 to determine photographic density.

In case that the normal copying mode is designated by the copying mode instruction switch 14, the density binary coding process is carried out of the image data which have been derived when the original was photographed, and then stored into the first image data memory unit 32. FIG. 5 shows a flowchart for explaining the density binary-coding process of the image data as carried out by the calculation unit 35. At first, an initialization I=0, J=0 is performed with respect to the arrangement of the imaging area, shown in FIG. 4, corresponding to the memory area of the first image data memory unit 32 (step A1). It should be noted that the above-described "I" and "J" as represented in FIG. 4, indicate a coordinate of three pixels which are handled as a single unit and extending in the horizontal and vertical directions, respectively. Also, "i" and "j" (will be discussed later) represent a coordinate of each of pixels. Then, an average value "A" of density of a 9×9 pixel area is set equal to zero (0) and a reference position of the pixel is determined as i=1 and j=1 (step A2). The average density values of the respective 3×3 pixel areas within the 9×9 pixel area are calculated under the condition that A=S/9+A (step A3). It should be noted that "S" corresponds to a total of the density data of the respective pixels within the above-described 3×3 area, and is calculated by the following equation (1):

$$S = f(I+i-1, J+j-1) + f(I+i, J+j-1) + f(I+i+1, J+j-1) + f(I+I-1, J+j) + f(I+i, J+j) + f(I+i+1, J+j) + f(I+I-1, J+j+1) + f(I+I, J+j+1) + f(I+i+1, J+j+1)$$

Thus, when the density average value "A" of the 3×3 area 100 positioned at the upper and left side with respect to the 9×9 pixel area, the pixel reference position is advanced by three pixels in the I direction under the condition that i=i+3 (step A4). At this time, since i=4, a "NO" judgement is made in a step A5, and the density binary-coding process is again returned to step A3. At this step A3, a summation is carried out between the density average value S/9 of the 3×3 area 101 positioned at the upper and center position of the above-described 9×9 pixel area, and the average density value calculated previously (in this case, the average density value of the 3×3 area 100) under the condition that the pixel position of i=4 is understood as the reference. Thereafter, the pixel reference position is advanced by 3 pixels in the I direction under the condition that i=i+3 (step A4). At this time, since i=7, a "NO" judgement is made at the step A5. Accordingly, the coding process is again returned to the step A3. At this step A3, another summation is executed between the average density value "A" previously calculated and the density average value S/9 of the 3×3 area 102 positioned at the upper and right position of the above-described 9×9 area under such a condition that the pixel position of i=7 is used as a reference. In other words, this density average value "A" is equal to a value obtained by adding the three density average values, i.e., the density average value of the 3×3 pixel areas 100, 101 and 102.

When i=i+3 is again applied by step A4, it yields i=10. Accordingly, a "YES" judgement result at a step A5 causes the binary coding process to advance to step A6. At this step A6, the pixel reference position in the I direction is again returned to i=1, whereas the pixel reference position in the J direction is equal to j=j+3, and it is advanced by three pixels in the J direction. At this time, since j=4, a "NO" judgement is made at a step A7, and the coding process is again returned to the previous step A3. At this step A3, the average density value S/9 of the 3×3 area 103 positioned at the center and left side of the 9×9 pixel area is summed with the addition result "A" of the density averages of the previously calculated areas 100, 101 and 102 under the condition that the pixel position of i=1 and j=4 is used as the reference. Also at the step A4, as i=i+3, the pixel reference position is advanced by 3 pixels along the I direction where a calculation is made of the average density value S/9 of the 3×3 area 104 positioned at the middle and center of the 9×9 area under the condition that the pixel position of i=4, j=4 is used as a reference. The resultant average density value is added to the above-described addition result "A".

Since the above-described steps A3 to A7 are repeatedly executed, the average density values of the respective 3×3 areas 100 to 108 which have been obtained by dividing the 9×9 area into 9 groups are calculated and the addition value of the average density values of these 9 areas is given as "A". Subsequently, at a step A8, as A=A/9, the average density value "A" is calculated for the entire 9×9 area.

In step A9, the following values are set: I=I+1, J=J+1, i=0, j=0. Then, the binary coding process is advanced to a step A10 in which a judgement is made relative to f(I+i, J+j). In other words, for I=1 and J=1, as set by step A9, a judgement is made whether or not the image density of a single pixel 109 positioned at the upper and left side of the centrally located 3×3 area 104 is higher than the average density value "A" for the entire 9×9 area. Let us assume that at this step A10, a judgement is made "NO". In other words, it is judged that the image density of the single pixel 109 is thinner than the above-described average density value "A". Then, the density binary coding process is advanced to a step A11a, where the binary-coded data g(I+i, J+j) equal to "0" (white) is assigned to this pixel. Let us now assume that at the step A10, another judgement is made "YES". That is, a judgement is made that the image density of the single pixel 109 is darker than the above-described average density value "A". Then, the process is advanced to a step A11b in which binary-coded data g(I+i, J+j) equal to "1" (black) is assigned to this pixel. Then, the above-described binary-coded data "0" or "1" is written into the memory area corresponding to the second image data memory unit 36 (step A12). Thus, at a step A13, the pixel reference position i=i+1 is advanced in the I direction by 1 pixel, and at this time since i=1, then a "NO" judgement is made at a step A14, and the process is again returned to the step A10. Thereafter, at the steps A10 to A12, the density data on the single pixel 110 positioned at the upper and center of the 3×3 pixel area with respect to the center of the 9×9 area, is binary-coded based upon the above-described average density value "A" in the same manner as just described for pixel 109, and the binary-coded data "0" or "1" assigned to pixel 110 is written into the second image data memory unit 36. Then, at the step A13, i=i+1 and at the step A14, a "NO" judgement is made. Accordingly, the process is returned to the previous step A10. In this case, the density data on the single pixel 111 positioned at the upper and right of the 3×3 area with respect to the center of the 9×9 area is binary-coded based upon the above-described density average value "A". Furthermore, the resultant binary-coded data "0" or "1" assigned to pixel 111 is written into the memory area corresponding to the second image data memory unit 36. Subsequently, at a step A13, i is made equal to i+1 so that now i=3. Then a "Yes" judgement is made at step A14, and the process proceeds to step A15 where the pixel reference position i is returned to 0 and the density binary-coding process is advanced to j=j+1. At this time, since j=1, a "NO" judgement is made at step A16. The process is returned to the above step A10. As a result, the density data on the single pixel 112 positioned at the middle and left side of the 3×3 area with respect to the center of the 9×9 area corresponding to the above i=0 and j=1, is binary-coded based upon the above-described density average value "A" at the step A11. At the next step A12, the binary-coded data assigned to pixel 112 is written in the memory area corresponding to the second image data memory unit 36. Thus, the above-described binary coding process steps A10 to A16 are repeated so that the density of each of the 9 pixels constituting the 3×3 area is binary-coded, and the binary coded for these pixels is successively written into the second image data memory unit 36.

Then, when the above-described density binary coding process is carried out for single pixels 113 to 117, the processes is advanced to i=3 at a step A13 and j=3 at a step A15. As a consequence, "Yes" judgements are made at steps A14 and A16. Then, the process is advanced to step A17 where J=J−1. It will be recalled that the value of J was increased by 1 in step A9 for use in steps A10 and A11. Step A17 returns J to its previous value so that further processing in the same row can continue. Although the value of I was also increased by step A9, this is necessary in order to advance the processing to the next 9×9 pixel area for binary coding of the subsequent 3×3 pixel area. If at step A17 I does not exceed 253, a "NO" judgement is made at a step A18, and the process is again returned to the previous steps A2.

That is, since the density binary coding process defined at the steps A2 to A18 is repeated, the density binary coding for the respective pixels within the 3×3 pixel area 104 with respect to the center of the 9×9 pixel area is successively performed along the I direction in 3 pixel steps, and is continued until I=254. At this time, all of the pixel data having the respective densities within the 3×3 area 104 (for each 9×9 pixel area) are binary coded for I between 1 and 254 and J=1, and the binary coded pixel data are stored in the second image data memory unit 36. Thereafter, the process is advanced to a step A19, where I is returned to 0 and the process is advanced to the next row J=J+1, the above-described processes defined at the steps A2 to A18 are repeated, and all of the pixel data of the 3×3 areas are binary-coded until J=2 and I=1 to 254, and thus are stored in the second image data memory unit 36. Thereafter, the return of I to 0 is repeatedly executed, and the advance process of J=J+1 is repeatedly performed at a step A19. When "J" reaches 167, a "NO" judgement is made at a step A20. As a consequence, the density binary coding process has been accomplished for all of the pixels except for the 3-pixel wide area around the periphery of the image sensor 23, and the binary coded pixel data have been stored in the second image data memory unit 36.

Even if there is a small density difference between a character and a background thereof, e.g., a black-colored character is written in a red-colored background, since the average density value of the 9×9 pixel area is used as the threshold level and the respective pixels within the 3×3 pixel area which is positioned at a center of the above-described 9×9 pixel area are binary-coded in the above-described density binary-coding process, both the character portion and background portion (in particular, at the boundary portion) can be binary-processed as clearly different data (black or white). This is because the binary coding operation is performed based upon the density of the characters and the average density of the background portion.

Contour Binary-Coding Process

Under the conditions that the digital data having the values corresponding to the densities of the image to be copied have been written in the first image data memory unit 32, in case that the contour duplication mode is designated by a duplication mode designation switch 14, the contour binary coding process is performed for the image data which have been acquired and stored into the first image data memory unit 32.

Figure 6:
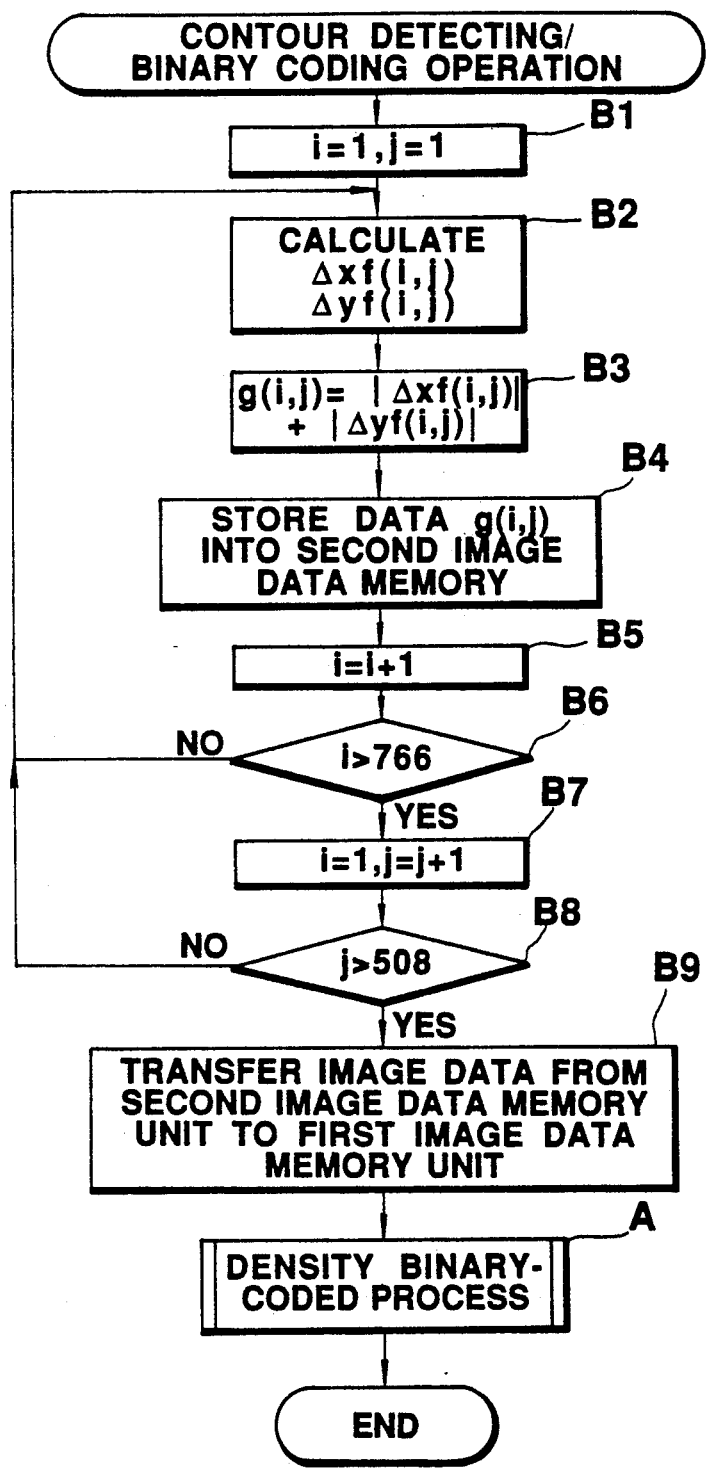
FIG. 6 is a flowchart for explaining a binary coding operation effected by the circuit shown in FIG. 3 to determine contour.

FIG. 6 is a flowchart for representing a contour binary-coding process of the image data. An initialization of i=1, j=1 is performed for the arrangement of the imaging area shown in FIG. 4, corresponding to the memory area of the first image data memory unit 32 (step B1). Referring to FIG. 4, the 3×3 pixel area 104 will be used as an example to explain this aspect of the invention because its pixels have been individually numbered. However, the same steps are carried out for each of the 9 3×3 pixel areas within a 9×9 pixel area. A calculation is executed so as to, firstly, obtain a density difference Δxf(i, j) in the x direction between 3 pixels 109, 112 and 115 positioned at the left side of the 3×3 pixel area 104, and 3 pixels 111, 114 and 117 positioned at the right side thereof and to, secondly, obtain a density difference in the y direction between 3 pixels 109, 110 and 111 positioned at the upper side of the same 3×3 pixel area 104 and 3 pixels 115, 116 and 117 positioned at the lower side thereof (step B2). These density differences in the X direction and the Y direction for this 3×3 pixel area are calculated by the following equations (2) and (3):

$$\Delta xf(i,j) = f(i-1, j-1) + f(i-1, j) + f(i-1, j+1) \\ - \{f(i+1, j-1) + f(i+1, j) + f(i+1, j+1)\} \quad (2)$$

$$\Delta yf(i,j) = f(i-1, j-1) + f(i, j-1) + f(i+1, j-1) \\ - \{f(i-1, j+1) + f(i, j+1) + f(i+1, j+1)\} \quad (3)$$

Thus, when both the density difference Δxf (i, j) in the X direction and the density difference Δyf (i, j) in the Y direction in the above-described 3×3 area are obtained, a value obtained by summing an absolute value of the density difference in the X direction with another absolute value of the density difference in the Y direction, is set to be a density gradient value of central pixel 113 of this 3×3 pixel area 104. Then, the density gradient value is written into a memory area of the corresponding second image data memory unit 36 (steps B3 and B4)

$$g(i, j) = |\Delta xf(i, j)| + |\Delta yf(i, j)| \quad (4)$$

Thereafter, at a step B5, the contour binary coding process is advanced to a pixel reference position (i=i+1). Until this "i" exceeds 766, the density gradient setting process with respect to the central pixel of the 3×3 area defined in the above-described steps B2 to B4 is successively repeated in such a manner that this process is shifted in the I direction by 1 pixel increments (step B6).

Thereafter, a "YES" judgement is made at a step B6. In other words, "i" is equal to 767 when the density gradient value setting process for the pixel corresponding to (i=766, j=1) is completed. Subsequently, when the process is advanced to a step B7, the value of i is returned to 1, and j is incremented by j=j+1. At this time, since j=2, a "NO" judgement is made at a step B8, and thus the process is returned to a step B2. Accordingly, at these steps B2 to B4, the density gradient setting process with respect to the pixel position of (i=1, j=2) is performed. Furthermore, the process defined at the steps B2 to B6 is repeated so that all of the density gradient values are set until the pixel array in the I direction being equal to i=766 as j equals 2. Then, as the process defined by the steps B2 to B8 is repeated, the density gradient setting process for the above-described 1 pixel increments (i=1 to 766) in the I direction is successively repeated in such a manner that this process operation is shifted by 1 pixel in the J direction. As a result, the density gradient setting process with respect to all of the pixels except for the 1 pixel area around all of the image sensor 23 is accomplished, and the resultant density gradient data are stored into the second image data image unit 36.

In accordance with the above-described process operation, after the density gradient value setting process with respect to 1 pixel increments based upon the density difference within the 3×3 area for the photographed image data has been completed, the data on the image to be copied corresponding to this density gradient are transferred from the second image data memory unit 36 to the first image data memory unit 32 (step B9). Then, with respect to the image data to which the density gradient values have been set at a single pixel unit and which have been stored in this first image data memory unit 32, the density binary coding process defined in the flowchart shown in FIG. 5 is performed. As a consequence, both the image data having the large density gradients and the image data having the normal density gradient are contour-binary-coded except for the 1 pixel wide area around the entire image, and the coded image data are stored into the second image data memory unit 36 (step A).

Basic Idea of Contour Binary-Coding Process for Image Data

Figure 7A:
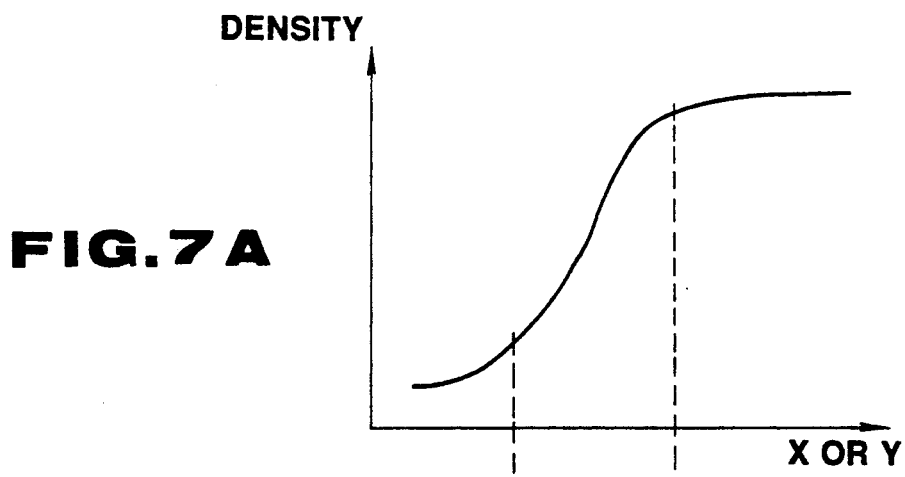
FIGS. 7A and 7B schematically illustrate a basic idea relating to the binary coding operation of the contour detection carried out in the compact copier represented in FIG. 1.
Figure 7B:
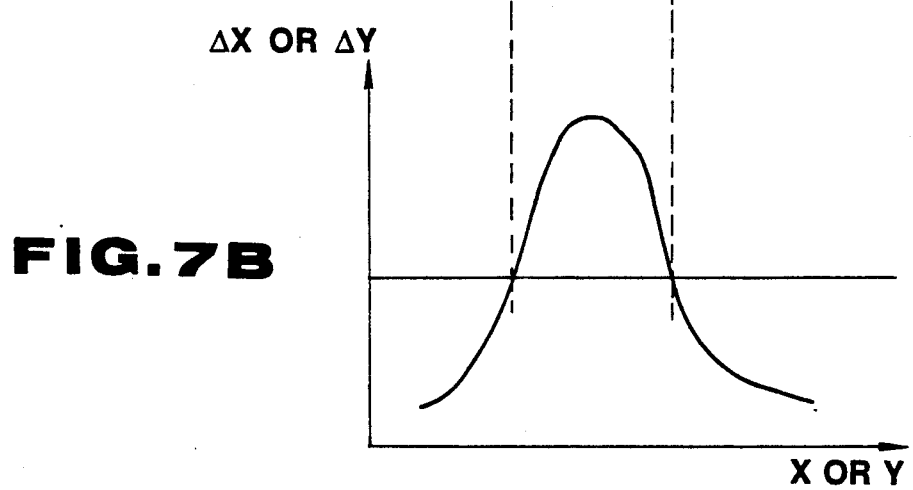

Referring now to FIGS. 7A and 7B, a basic idea of a contour binary coding process for image data will be described.

A region where a density gradient of image data in either the X direction, or Y direction is rapidly changed as is shown in FIG. 7A, is recognized as a density difference thereof $\Delta x$ or $\Delta y$ as is shown in FIG. 7B. This density difference data is averaged so as to produce binary-coded data thereof. That is to say, the data on the portion of the original in which the color of the image varies, read out by the image sensor 23, is represented as a density distribution as shown in FIG. 7A in accordance with the reflectance of this color. Then, a density difference as represented in FIG. 7B is formed based upon the above-described density distribution. As the density difference is binary-coded, the changing point of the color may be represented as black (1-level) data, whereas other portions may be indicated as white (0-level) data.

As a result, this image is finally obtained as a contour image.

It should be noted that the address control for both the first image data memory unit 32 and second image data memory unit 36 is carried out under the control of the address control unit 37 during both the density binary-coding process and contour binary-coding process in response to the control signal derived from the control unit 20. Also, the density calculation binary-coding process is executed in the calculation unit 35 in response to the calculation control signal derived from the control unit 20.

To print out the image data which have been processed by either the density binary-coding operation, or the contour binary-coding operation, and thereafter stored into the second image data memory unit 36, first of all, the mode selecting switch 13 is set to the printing mode and the release switch 12 is depressed. Then, the binary-coded image data of the image to be copied which have been stored in the second image data memory unit 36 are read out as print data to the print control unit 38. Thus, the print data are sequentially transferred to the thermal head 18 in response to the feeding speed of the heat sensitive recording paper "P". As a result, the image to be copied is printed out on the recording paper "P" under the condition that the densities thereof are converted into black/white conditions, or the contour of the image is converted into the black condition. As previously described, since both the character portion and background portion can be converted into clearly different data (i.e., black or white data) in case that the binary coding operation is carried out by way of the density binary-coding process, even when both the colors of the characters and background are relatively equal densities with each other, the characters can be correctly or accurately reproduced without deteriorating the contour thereof as in the conventional quasi-binary coding operation.

Furthermore, in case that the binary coding operation is performed by utilizing the above-described contour binary-coding process, since only the portion where the color (density) thereof is changed may be represented as the black data, and also the remaining same color (density) portion may be represented as the white data, the contours of the characters can be clearly represented even when both the colors of the characters and also background have nearly equal densities. Also in case that a pattern or the like constructed of a plurality of colors is binary-coded, the boundary portions of the respective colors are represented as black and also the area having the same color is represented as white so that the shape of the pattern can be correctly or accurately represented.

Other Binary-Code Image Forming Apparatus

Figure 8:
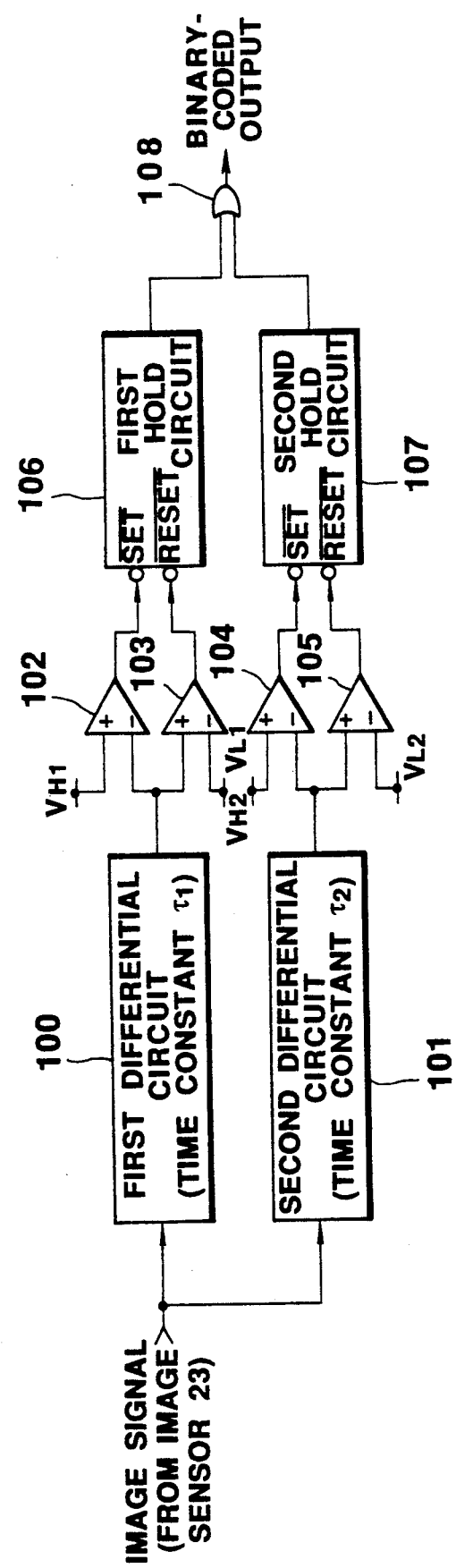
FIG. 8 is a schematic block diagram of a circuit arrangement of another binary coding circuit according to a second preferred embodiment of the present invention; and, FIGS. 9A to 9F are signal waveform graphs for representing output waveforms of major circuit portions in the binary coding circuit shown in FIG. 8.

FIG. 8 is a schematic block diagram of a binary coding circuit according to another preferred embodiment of the invention.

An image signal which is obtained from, for instance, the image sensor 23 of the compact copying machine shown in FIG. 3, and supplied via the amplifying/signal-processing unit 30, is supplied to a first differential circuit 100 and second differential circuit 101.

These first and second differential circuits 100 and 101 calculate the differential of the above-described image signal based upon different time constants $\tau_1$ and $\tau_2$ (note $\tau_1$ is greater than $\tau_2$).

The differential value signal output from the first differential circuit 100 is supplied to a minus (negative) terminal of the first comparator 102 and also a plus (positive) terminal of a second comparator 103. On the other hand, the differential value signal output from the second differential circuit 101 is supplied to a minus (negative) terminal of a third comparator 104 and a plus (positive) terminal of a fourth comparator 105.

Now, it should be noted that a binary-coding reference voltage "VH1" is applied to a plus terminal of the first comparator 102, and another binary-coding reference voltage "VL1" is applied to a minus terminal of the second comparator 103, a further binary-coding reference voltage "VH2" is applied to a plus terminal of the third comparator 104, and moreover a still further binary-coding reference voltage "VL2" is applied to a minus terminal of the fourth comparator 105. In this case, the respective voltage levels of these binary-coding reference voltages "VH1", "VL1," "VH2", and "VL2" have the following relationships:

VH1>VH2>0>VL2>VL1.

The outputs from the first and second comparators 102 and 103 are supplied to a set terminal and a reset terminal of a first holding circuit 106, respectively. The outputs from the third and fourth comparators 104 and 107 are furnished to a set terminal and a reset terminal of a second holding circuit 107, respectively.

It should be understood that the above-described first differential circuit 100, first and second comparators 102 and 103, and further the first holding circuit 106 constitute a binary-coding circuit for obtaining a binary output for those portions of an image signal involving changes of relatively large magnitude. On the other hand, the above-described second differential circuit 101, third and fourth comparators 104 and 105, and also second holding circuit 107 constitute a binary-coding circuit for obtaining a binary-coded output for those portions in response to an image signal involving changes of a relatively small magnitude.

Then, the outputs derived from the first holding circuit 106 and second holding circuit 107 are supplied to an OR gate 108. An output of this OR gate 108 is supplied as a final binary-coded signal of this image signal to, for instance, the second image data memory unit 36.

Binary-Coding Operation of second Binary Coding Circuit

Referring now to FIGS. 9A to 9F representing output signal waveforms, a binary-coding operation of the above-described binary-coding circuit will be described.

Figure 9A:
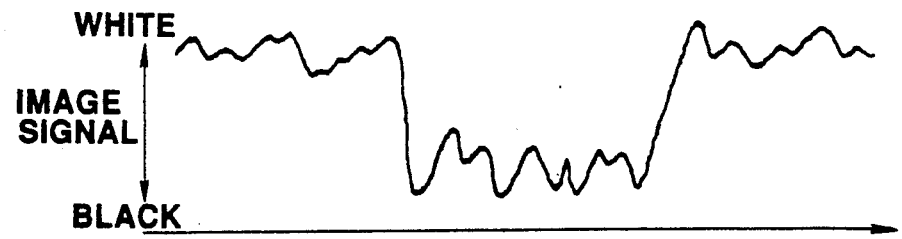
Figure 9B:
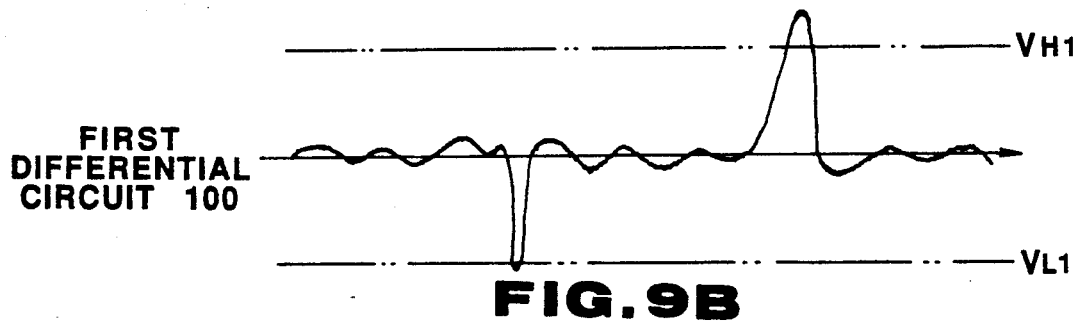
Figure 9C:
Figure 9D:
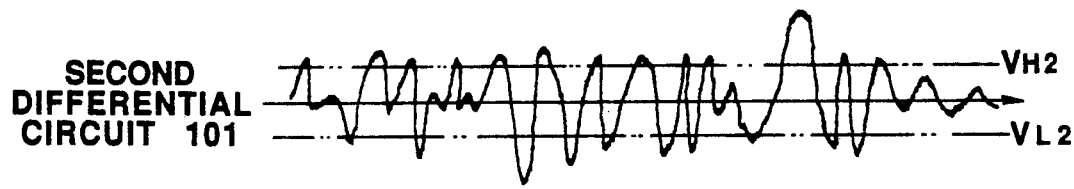
Figure 9E:
Figure 9F:

First, the image signal represented in FIG. 9A is supplied to the first and second differential circuits 100 and 101 so as to produce differential output signals represented in FIGS. 9B and 9D based on the respective time constants $\tau_1$ and $\tau_2$.

Since the time constant $\tau_1$ of the first differential circuit 100 is large, a differential output of the image signal is obtained therefrom in response to the relatively large variations of the image signal.

On the other hand, since the time constant $\tau_2$ of the second differential circuit 101 is small, a differential output of the image signal is obtained therefrom in response to the relatively small variations of the image signal.

The output of the first differential circuit 100 is supplied to the first and second comparators 102 and 103, and compared with the corresponding reference voltage "VH1" and "VL1". The first comparator 102 outputs a low level signal when the above-described differential output exceeds the reference voltage "VH1". In other words, the image signal changes from the black level side to a white level side. On the other hand, the second comparator 103 outputs a low level signal in case that the differential output falls below the reference voltage VL1, namely the image signal is varied from the white level into the black level.

Then, the outputs from the first and second comparators 102 and 103 are supplied to the first hold circuit 106. This first hold circuit 106 is set when the low level signal is output from the first comparator 102, and reset when another low level signal is output from the second comparator 103. In other words, the first hold circuit 106 is set under the condition that the black level of the image signal is varied to the white level thereof, whereas this circuit 106 is reset under the condition that the white level of the image signal is changed into the black level. As a consequence, a roughly binary-coded image signal represented in FIG. 9C is obtained.

On the other hand, the differential output from the second differential circuit 101 is supplied to the third and fourth comparators 104 and 105 so as to be compared with the corresponding reference voltages VH2 and VL2. It should be noted that the third comparator 104 outputs the low level signal when the differential output exceeds the reference voltage VH2. Since this differential output responds to small changes in the image signal and "VH2" is lower than "VH1", this differential output also responds to the small changes of the image signal from the black level to the white level. Similarly, the fourth comparator 105 responds to small changes of the image signal from the white level to the black level, as compared with the second comparator 103.

The outputs from the third and fourth comparators 104 and 105 are supplied to the second hold circuit 107. As a result, the output signal represented in FIG. 9E of this second hold circuit 107 becomes a binary-coded signal in response to the small changes in the image signal.

Thereafter, the outputs of the first and second hold circuits 106 and 107 are supplied to the OR gate 108 so as to be added to each other. Then, the summed signal is output as the final binary-coded image signal shown in FIG. 9F. That is, the binary-coded signal output from the OR gate 108 has been roughly binary-coded in such a manner that this signal represents an original document having a large white portion. To the contrary, the finely binary-coded signal is produced from such as image signal having a large black portion.

The above-described binary-coding circuit is useful for reading, for instance, such an original document having characters written on a white background, so that a space portion of the original document having the white background becomes a binary-coded output from which signal changes caused by the noise and smear of the original document have been cut out. A portion of the original document having a relatively significant black portion can be obtained as the binary-coded output representing the fine information.

Also, the above-described binary coding circuit may be applied to, for instance, such an original document where a white character is drawn on a black background by substituting the OR gate 108 with an AND gate.

What is claimed is:
1. An image processing apparatus comprising:
   image sensing means having a plurality of photoelectric converting elements arranged in rows and columns in a matrix form, for outputting electric signals of an optical image converted by said photoelectric converting elements;
   selecting means for selecting said electric signals produced by an n×n ("n" being an integer) array of said photoelectric converting elements;

arithmetic means for producing an average value of said electric signal selected by said selecting means; and binary data producing means for producing binary data in response to electric signals produced by an m×m ("m" being an integer) array of said photoelectric converting elements which produce the electric signal selected by said selecting means, with said average value produced by said arithmetic means as a threshold value.

2. The image processing apparatus of claim 1, further comprising:

analog-to-digital converting means for converting said electric signals output from said image sensing means into digital data corresponding to a value of said electric signals;

wherein said selecting means includes means for selecting said digital data corresponding to said n×n array of photoelectric converting means;

said arithmetic means includes means for producing said average value based on said digital data selected by said selecting means; and said binary data producing means includes means for producing said binary data in response to said digital data corresponding to said m×m array at the center of said n×n array selected by said selecting means, with said average value produced by said arithmetic means as said threshold value.

3. The image processing apparatus of claim 2, further comprising:

first memory means for storing said digital data obtained by said analog-to-digital converting means; and second memory means for storing said binary data produced by said binary data producing means;

wherein said selecting means includes means for reading out from said first memory means said digital data corresponding to said n×n array of photoelectric converting elements.

4. An image processing apparatus comprising:

image sensing means having a plurality of photoelectric converting elements for outputting electric signals of an optical image converted by a said photoelectric converting elements in a predetermined order;

difference-value signal producing means for producing difference-value signals according to a difference in amounts of said electric signals output from said image sensing means;

first binary data output means for outputting one-leveled data of first binary data after said difference-value signals produced by said difference-value signal producing means become more than a first positive reference value, and for outputting another-level data of said first binary data after said difference-value signals produced by said difference-value signal producing means become less than a first negative reference value;

second binary data output means for outputting one-leveled data of second binary data after said difference-value signals produced by said difference-value signal producing means become more than a second positive reference value which is less than said first positive reference value, and for outputting another-leveled data of said second binary data after said difference-value signals produced by said difference-value signal producing means become less than a second negative reference value which is more than said first negative reference value; and, addition means for adding said second binary data output from said second binary data output means, while said first binary data output means outputs one of one-leveled data and another-leveled data, to said first binary data output from said first binary data output means.

5. The image processing apparatus of claim 4, wherein said difference-value signal producing means includes:

first difference-value signal producing means for producing first difference-value signals according to a difference in the amounts of said electric signals output from said image sensing means at a long interval; and, second difference-value signal producing means for producing second difference-value signals according to a difference in the amounts of said electric signals output from said image sensing means at a short interval;

said first binary data output means includes means for outputting said one-leveled data of first binary data after said first difference-value signals produced by said first difference-value signal producing means become more than said first positive reference value, and for outputting said another-leveled data of said first binary data after said first difference-value signals produced by said first difference-value signal producing means become less than said first negative reference value; and, said second binary data output means includes means for outputting one-leveled data of second binary data after said second difference-value signals produced by said second difference-value signal producing means become more than said second positive reference value which is less than said first positive reference value, and for outputting said another-leveled data of said second binary data after said second difference-value signals produced by said second difference-value signal producing means become less than a second negative reference value which is more than said first negative reference value.

6. The image processing apparatus of claim 5, wherein said first difference-value signal producing means includes first differential calculus means for differentiating said electric signals output from said image sensing means based on a first time constant $\tau_1$; and, said second difference-value signal producing means includes second differential calculus means for differentiating said electric signals output from said image sensing means based on a second time constant $\tau_2 (\tau_1 > \tau_2)$.

7. The image processing apparatus of claim 4, wherein said addition means includes an OR gate.

8. A method of operating an image processing apparatus which comprises image sensing means having a plurality of photoelectric converting elements arranged in rows and columns in a matrix form, the method comprising the steps of:

outputting electric signals converted from an optical image by said photoelectric converting elements;

selecting said electric signals produced by an n×n ("n" being an integer) array of said photoelectric converting elements;

producing an average value of said selected electric signals; and, producing binary data in response to electric signals produced by an m×m ("m" being an integer) array of said photoelectric converting elements at the center of said n×n array of said photoelectric converting elements, with said average value as a threshold value.

9. The method of claim 8, further comprising the step of:
converting said electric signal output from said image sensing means into digital data corresponding to a value of said electric signals;
wherein said selecting step includes the step of selecting digital data corresponding to said n×n array of photoelectric converting means;
said average value producing step includes the step of producing said average value based on said selected digital data; and
said binary data producing step includes the step of producing said binary data in response to digital data corresponding to said m×m array at the center of said n×n array represented by said selected digital data.

10. A method of operating an image processing apparatus in constructed of at least image sensing means having a plurality of photoelectric converting elements, said method comprising the steps of:
outputting electric signals converted from an optical image by said photoelectric converting elements;
producing difference data according to a difference between amounts of at least two electric signals produced by said photoelectric converting elements arranged closely each other; and,
producing binary data in response to said difference data.

11. The method of claim 10, wherein said photoelectric converting elements are arranged in rows and columns in a matrix form;
said difference-data producing step includes the steps of:
producing first difference data according to a difference the amounts of at least two electric signals produced by said photoelectric converting elements arranged in row;
producing second difference data according to a difference the amounts of at least two electric signals producing by said photoelectric converting elements in column; and,
adding said first difference data to said second difference data.

12. A method of operating an image processing apparatus constructed of at least image sensing means having a plurality of photoelectric converting elements, said method comprising the steps of:
outputting electric signals converted from an optical image by said photoelectric converting elements in a predetermined order;
producing difference-value signals according to a difference in amounts of said electric signals output from said image sensing means;
outputting one-leveled data of first binary data after said difference-value signals become more than a first positive reference value and outputting another-leveled data of said first binary data after said difference-value signals become less than a first negative reference value;
outputting one-leveled data of second binary data after said difference-value signals become more than a second positive reference value, and outputting another-leveled data of said second binary data after said difference-value signals become less than second negative reference value which is more than said first negative reference value; and,
adding said second binary data being output, while one of one-leveled data and another-leveled data is output, to said first binary data being output.

13. The method of claim 12, wherein said difference-value signal producing step includes the steps of:
producing said first difference-value signals according to a difference in the amounts of said electric signals output from said image sensing means at a long interval; and,
producing second difference-value signals according to a difference in the amount of said electric signals output from said image sensing means at a short interval;
said first binary data outputting step includes the step of outputting one-leveled data of first binary data after said first difference-value signals become more than a first positive reference value and of outputting another-leveled data of said first binary data after said first difference-value signals become less than a first negative reference value; and,
said second binary data outputting step includes the step of outputting one-leveled data of second binary data after said second difference-value signals become more than a second positive reference value which is less than said first positive reference value, and of outputting another-leveled data of said second binary data after said second difference-value signals become less than second negative reference value which is more than said first negative reference value.

14. The method of claim 13, wherein said first difference-value signal producing step includes the step of differentiating said electric signals output from said image sensing means based on a first time constant $\tau_1$; and,
said second difference-value signal producing step includes the step of differentiating said electric signals output from said image sensing means based on a second time constant $\tau_2 (\tau_1 > \tau_2)$.

* * * * *

UNITED STATES PATENT AND TRADEMARK OFFICE
CERTIFICATE OF CORRECTION

PATENT NO. : 5,182,657
DATED : January 26, 1993
INVENTOR(S) : SATO et al.

It is certified that error appears in the above-indentified patent and that said Letters Patent is hereby corrected as shown below:

Column 15, line 7 (claim 1), after "converting elements"

Insert: --at the center of said n x n array of photoelectric converting elements--.

Column 17, line 32 (claim 10), after "closely",

Insert: --to--.

Column 17, lines 40-41 (claim 11), after "difference",

Insert: --between--.

Column 17, lines 44-45 (claim 11), after "difference",

Insert: --between--.

Column 17, line 47 (claim 11),

Change: "in column" to --arranged in a column--.

Signed and Sealed this

Eleventh Day of October, 1994

BRUCE LEHMAN

*Attest:*

*Attesting Officer*    *Commissioner of Patents and Trademarks*